United States Patent [19]

Demarthe et al.

[11] 4,435,368

[45] Mar. 6, 1984

[54] HYDROMETALLURGICAL PROCESS FOR SELECTIVE DISSOLUTION OF MIXTURES OF OXY COMPOUNDS

[75] Inventors: Jean-Michel Demarthe, Viroflay; Paolo Fossi, Elancourt; Louis Gandon, Rambouillet, all of France

[73] Assignee: Mitsubishi Rayon Co., Ltd., Tokyo, Japan

[21] Appl. No.: 86,791

[22] Filed: Oct. 22, 1979

Related U.S. Application Data

[63] Continuation of Ser. No. 950,446, Oct. 11, 1978, which is a continuation of Ser. No. 904,306, May 9, 1978, abandoned, which is a continuation of Ser. No. 765,813, Feb. 4, 1977, abandoned.

[30] Foreign Application Priority Data

Feb. 6, 1976 [FR] France .................. 76 03266

[51] Int. Cl.³ .................. C01G 5/00; C01G 51/00; C01G 53/00; C01G 21/00
[52] U.S. Cl. .................. 423/40; 423/27; 423/98; 423/150; 75/101 R; 75/112; 75/114; 75/117; 75/119
[58] Field of Search .................. 423/38–40, 423/98, 109, 150, 27; 75/112, 114, 101 R, 119, 117

[56] References Cited

U.S. PATENT DOCUMENTS

| 350,669 | 10/1886 | Endlich | 423/40 |
|---|---|---|---|
| 1,736,659 | 11/1929 | Mitchell | 423/40 |
| 2,971,836 | 2/1961 | Hall | 75/119 |
| 3,647,261 | 3/1972 | Stenger | 75/112 |
| 3,880,651 | 4/1975 | Queneau | 423/40 |

Primary Examiner—Edward J. Meros
Assistant Examiner—Robert L. Stoll
Attorney, Agent, or Firm—Oblon, Fisher, Spivak, McClelland & Maier

[57] ABSTRACT

The invention provides a process for the selective dissolution of oxygenated compounds containing at least one non-ferrous metal selected from the group consisting of nickel, zinc, and copper, present in a mixture of oxygenated compounds containing said at least one non-ferrous metal and at least one element selected from the group consisting of lead, cobalt, iron, manganese, and silicon, and comprises suspending the mixture of the oxygenated metallic compounds in an aqueous phase which, preferably, contains chloride and alkaline earth metal ions; treating the resulting aqueous suspension, maintained at a pH exceeding about 1, with chlorine, preferably at a temperature ranging from about 60° C. to the boiling point of the suspension, to selectively solubilize the said at least one non-ferrous metal while the said at least one element remains in an essentially insoluble residue; and separating the aqueous solution containing the dissolved said at least one non-ferrous metal from the insoluble residue. The starting mixture of the oxygenated compounds is exemplified by the product resulting from the roasting of a nickel matte, a basic carbonate of nickel, a mineral oxide of zinc, and the dust of a blast furnace.

1 Claim, 1 Drawing Figure

HYDROMETALLURGICAL PROCESS FOR SELECTIVE DISSOLUTION OF MIXTURES OF OXY COMPOUNDS

This is a continuation of application Ser. No. 950,446, filed Oct. 11, 1978, which is a continuation of 904,306, filed May 9, 1978, now abandoned, which is also a continuation of 765,813, filed Feb. 4, 1977, now abandoned.

The present invention relates to a hydrometallurgical process for the selective dissolution of mixtures of metallic oxy compounds; it relates particularly to the selective putting into solution of certain non-ferrous metals present in these mixtures.

In the course of the putting into operation of processes by which pure metal is obtained from mineral, the metallurgist often meets mixtures of metallic oxy compounds. These mixtures can be met at any stage of the extraction of the metal, from the mineral, which can be a mixed oxide, up to the residues from the refining of the metals. One may cite as examples of such mixtures, the products of roasting of pyrites, the products of roasting of nickel mattes and the basic carbonates of nickel (B.N.C.) which are derived from a first reduction of the mineral following ammoniacal lixiviation.

In order to continue the process of extraction of the metal or metals, it is necessary to separate one from the other and, in particular to separate iron which is very often present in minerals of non-ferrous metals and which is then found in variable proportions in the first stages of the purification of these metals.

To carry out this separation, one proceeds, in general, to put into solution the metals to be recovered; this dissolution is most often done by means of hydrochloric or sulphuric acid; however, these dissolutions are not selective and appreciable amounts of iron are found in the final solutions.

This is why it is an aim of the invention to provide a process for the selective dissolution of oxides of non-ferrous metals which permits their separation from iron, manganese and silica.

More particularly, an aim of the invention is to provide a process of selective dissolution of nickel oxide which allows it to be separated from oxides of cobalt, lead and copper.

Another aim of the invention is to provide a process of selective dissolution of zinc oxide which allows it to be separated from oxides of copper and lead.

Another aim of the invention is to provide a process of selective dissolution of copper oxide which allows it to be separated from lead oxide.

According to the invention, these aims and others which will become apparent later are obtained by means of a process described below.

This process consists essentially in putting into suspension in an aqueous phase the mixture of oxides to be treated and then subjecting this suspension to the action of chlorine.

The term "oxygenated compounds" as used herein is intended to include a large number of compounds including oxides, hydroxides, carbonates, basic carbonates, and even certain sulphates and silicates.

The chlorine necessary for the operation of this process is introduced in any convenient manner; it can thus be synthesised in situ by chemical or electrochemical means or introduced into the solution in the form of gaseous chlorine.

Although it is possible to carry out the process at elevated temperatures, it is more convenient to perform the dissolution at a temperature below that of the boiling point of water and preferably between 60° and 100° C.

The selectivity of the dissolution depends greatly on the pH and it is important to keep the pH beyond certain values which vary according to the oxide which it is desired to preferentially dissolve; in general, the pH should not be below the value of 1–2 and more often 3–4; this why it can be necessary to provide systems to keep a minimum pH. This is particularly important whilst the mixture contains much sulphur in its elemental form or as sulphide; the oxidation of sulphur by chlorine indeed causes a significant liberation of acidity.

It is also possible to vary the selectivity of the dissolution by varying the composition, the complexing agents such as the chloride ion and the pH of the aqueous phase which serves to suspend the mixture of oxygenated compounds.

Thus, strong concentrations of chloride ion bring about an easier solution of the metals which form the complexes with the chloride ion.

It may also be noted that the presence of calcium ions strongly lowers the concentration of sulphate ions and thus allows an easier dissolution of metals which have insoluble sulphates and particularly of lead; by contrast, the presence of sulphate ions prevents the dissolution of plumbous ions.

This process of dissolution is particularly noteworthy by reason of its selectivity. At first, only the zinc and the nickel are dissolved, then as the process is continued copper is dissolved, and then lead which only dissolves in aqueous phases which are rich both in chloride ions and in ions of alkaline earth metals (calcium, strontium, barium, radium). Neither iron, manganese, cobalt nor silica are dissolved appreciably.

It will be appreciated that such a selective dissolution process is advantageous; indeed, not only does it allow separation of nickel and cobalt, or of zinc, copper and lead, but it also allows the purification of iron, cobalt and manganese which remain insoluble in these conditions.

The invention will be further described with reference to a preferred embodiment indicated in the accompanying drawing, but this description is not limitative of the invention.

The single FIGURE of the drawing is a diagramatic flowsheet of the process according to the invention.

Figure 1:
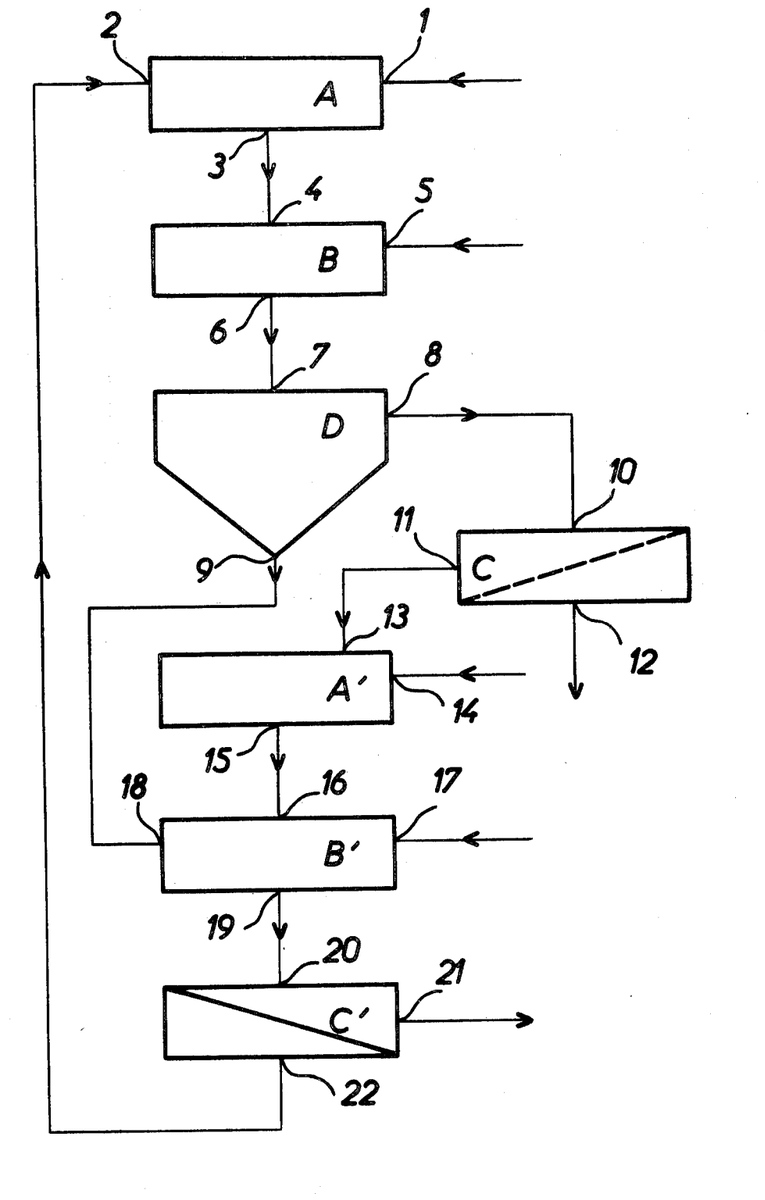

Referring to this FIGURE, the mixture of oxygenated compounds to be treated arrives at 1 in an apparatus A where it is suspended in a solution which is introduced at 2. The suspension which leaves at 3 from A enters a reactor B where it is subjected to the action of gaseous chlorine which is introduced at 5.

The solution obtained after the reaction is removed from B at 6 and introduced at 7 into a decanting vessel D where the larger particles are separated from the solution and removed in the form of a suspension at 9. The thus clarified solution is led into a filtration apparatus C where the solid and liquid phases are then separated; the solid phase is removed at 11 whilst the liquid phase is drawn off at 12 and is passed to another type of apparatus (not shown) where it is subjected to further treatments to produce metal salts or pure metals.

The solid phase which leaves at 11 from C is led at 13 into an apparatus A' in which it is subjected to suspension in an aqueous phase which enters at 14; this aqueous phase can be water, or a solution derived from another stage of the dissolution process if it is desired to operate an apparatus consisting of more than 2 stages. The suspension leaves at 15 from A' and enters at 16 a reactor B' in which it is mixed with the suspension which leaves at 9 from D and which enters at 18 into B'; the mixture of the two suspensions is then subjected to a bubbling of chlorine which is introduced into the vessel B' at 17.

The solution which leaves at 19 from B' is led at 20 into a filtration apparatus C' where the solid and liquid phases are separated; the liquid phase is recovered at 22 and returned at 2 into A, whilst the solid phase is removed at 21; the solid phase can be discarded, or subjected to a further dissolution in the case of a multistage installation.

The stage of decantation can sometimes be omitted, in which case the solution which leaves at 6 from B is directly passed into the vessel C at 10.

The following non-limitative examples are provided to further illustrate the invention and to enable the experts to determine the suitable operating conditions in each particular case.

In the tables below, the abbreviation "n.d." means "not determined".

METHOD OF OPERATION OF EXAMPLES I TO VII

In a reactor equipped with a cooling coil, an agitator, a thermometer and a pipe for injection of chlorine, there was poured the desired amount of water or of a solution of sodium chloride or calcium chloride, and then the mixture of oxygenated compounds was added either in one batch or little by little.

The resultant suspension, kept under constant agitation, was then brought to the working temperature. Injection of chlorine into the reactor was then commenced and continued during the duration of the reaction. At regular intervals, samples were taken in order that the course of the reaction should be followed.

At the end of the reaction, the reaction mixture was filtered and the mother liquor recovered; the residual cake was then washed with water and the washing water covered. The mother liquor, the washing water and the residual cake were analysed. The cake could then be subjected to a new dissolution in chlorine.

Then, the co-efficient of selectivity K was calculated according to the formula:

$$K = \frac{\dfrac{\text{Concentration of regarded metal in the solution}}{\text{Impurity concentration in the solution}}}{\dfrac{\text{Content of regarded metal in the initial product}}{\text{Impurity content in the initial product}}}$$

e.g., if Nickel is the regarded metal and if Iron is the impurity:

$$K = \frac{\dfrac{(Ni^{2+})_{solution}}{(Fe^{2+})_{solution} + (Fe^{3+})_{solution}}}{\dfrac{Ni_{Initial\ Product}}{Fe_{Initial\ Product}}}$$

EXAMPLE 1

| Mixture to be treated | 1 kg of wet B.N.C. containing 16.89% by weight of nickel |
|---|---|
| Aqueous phase for the suspension | 500 ml water |
| Amount of chlorine injected | 40 g per hour |
| Duration of the reaction | 7 hours |
| Working temperature | 75° C. |

(a) Change in pH and amount of nickel in solution as a function of time

| Duration of the reaction (hours) | Amount of $Ni^{++}$ in the solutions obtained | pH of reaction mixture at 75° C. |
|---|---|---|
| 0 | 0.040 | 7.5 |
| ½ | 6.2 | 6.1 |
| 1 | 15.8 | 5.8 |
| 2 | 36.0 | 5.4 |
| 3 | 54.4 | 4.8 |
| 4 | 73.0 | 4.3 |
| 5 | 84.2 | 4.0 |
| 6 | 87.0 | 3.7 |

(b) Results of the dissolution.

The results of the analysis of the cake, the mother-liquors and the washing waters are given in the following table together with the composition of the starting mixture:

| | COMPOSITION | | | | |
|---|---|---|---|---|---|
| | of the initial product (dry) (%) | of the mother-liquor (g/l) | of the washing waters (g/l) | of the cake (fully dry) (%) | K with respect to iron (mother-liquor) |
| Nickel (Ni) | 47.00 | 97 | 52 | 50 | 590 |
| Cobalt (Co) | 0.65 | $3.4.10^{-3}$ | $0.6.10^{-3}$ | 4.40 | 1.3 |
| Iron (Fe) | 0.20 | $0.7.10^{-3}$ | $\leq 0.2.10^{-3}$ | 0.95 | |
| Manganese (Mn) | 0.05 | $0.5.10^{-3}$ | $\leq 0.1.10^{-3}$ | 0.31 | 2.9 |
| Zinc (Zn) | 0.08 | 0.18 | $32.10^{-3}$ | nd | 640 |
| Copper (Cu) | 0.07 | 0.018 | $2.3.10^{-3}$ | nd | 72 |
| Lead (Pb) | $\leq 0.001$ | nd | nd | nd | |
| Sulphate ($SO_4^{--}$) | 4.95 | 17.8 | 4.3 | 2.60 | |
| Total Sulphur (S) | 2.41 | 5.9 | 1.5 | 0.96 | |
| Carbon dioxide ($CO_2$) | 6.99 | nd | nd | nd | |
| Ammonia ($NH_3$) | 0.51 | $\leq 20.10^{-3}$ | $\leq 20.10^{-3}$ | nd | |
| Chromium (Cr) | $\leq 0.002$ | nd | nd | nd | |
| Aluminium (Al) | $\leq 0.005$ | nd | nd | nd | |
| Bismuth (Bi) | $\leq 0.005$ | nd | nd | nd | |
| Tin (Sn) | $\leq 0.005$ | nd | nd | nd | |
| Sodium (Na) | $< 0.01$ | nd | nd | nd | |
| Calcium (Ca) | nd | nd | nd | nd | |
| Final pH | | | | 3.7 | |

EXAMPLE II

| Mixture to be treated | 1000 g of B.N.C. containing 16.89% of nickel |
|---|---|
| Aqueous phase for the suspension | 500 ml of 1 M sodium chloride |
| Amount of chlorine injected | 40 g per hour |
| Duration of the reaction | 5 hours |
| Working temperature | 75° C. |

The results of the analysis of the cake, the mother-liquor and the washing water are given in the following table together with the composition of the (fully dry) starting mixture:

| | COMPOSITION | | | | |
|---|---|---|---|---|---|
| | of the dried initial product (%) | of the mother-liquors (g/l) | of the washing waters (g/l) | of the cake (%) | K with respect to iron (mother-liquors) |
| Nickel (Ni) | 47.00 | 105 | 36.5 | 51 | 110 |
| Cobalt (Co) | 0.65 | 0.13 | 0.004 | 3.90 | 1 |
| Iron (Fe) | 0.70 | 0.004 | 0.002 | 0.71 | — |
| Manganese (Mn) | 0.05 | ≦0.0001 | ≦0.0001 | 0.23 | <1 |
| Zinc (Zn) | 0.08 | 0.150 | 0.049 | 0.034 | 108 |
| Copper (Cu) | 0.07 | 0.025 | 0.0046 | 0.23 | 18 |
| Lead (Pb) | ≦0.001 | 0.001 | ≦0.0001 | 0.0005 | 50≦ |
| Sulphate (SO$_4^{--}$) | 4.95 | 20.0 | | 1.95 | |
| Total sulphur (S) | 2.41 | 6.6 | | 1.30 | |
| Carbon dioxide (CO$_2$) | 6.99 | nd | | | |
| Ammonia (NH$_3$) | 0.51 | nd | | | |
| Chromium (Cr) | ≦0.002 | nd | | | |
| Aluminium (Al) | ≦0.005 | nd | | | |
| Bismuth (Bi) | ≦0.005 | nd | | | |
| Tin (Sn) | ≦0.005 | nd | | | |
| Sodium (Na) | <0.01 | 15 | | | |

| Volume of mother-liquor | 850 ml |
|---|---|
| Volume of washing water recovered | 1200 ml |
| Dry weight of residual cake | 68 g |
| Yield of the dissolution of the nickel | 79.3% |

EXAMPLE III

| Mixture to be treated | 1000 g of B.N.C. containing 16.89% nickel |
|---|---|
| Aqueous phase for the suspension | 500 ml of 1.3 M calcium chloride solution |
| Amount of chlorine injected | 1.3 M |
| Duration of the reaction | 6 hours |
| Working temperature | 75° C. |

The results of the analysis of the cake, the mother-liquor and the washing water are given in the following table, together with the composition of the starting mixture:

| | COMPOSITION | | | | |
|---|---|---|---|---|---|
| | of the dried initial product (%) | of the mother-liquors (g/l) | of the washing waters (g/l) | of the cake (%) | K with respect to iron (mother-liquor) |
| Nickel (Ni) | 47.00 | 91 | 48 | 38.8 | 390 |
| Cobalt (Co) | 0.65 | 0.01 | 0.005 | 2.9 | 3 |
| Iron (Fe) | 0.70 | 0.001 | 0.0007 | 0.47 | |
| Manganese (Mn) | 0.05 | 0.002 | 0.0008 | 1.56 | 8 |
| Zinc (Zn) | 0.08 | 0.120 | 0.066 | 0.018 | 300 |
| Copper (Cu) | 0.07 | 0.044 | 0.015 | 0.15 | 125 |
| Lead (Pb) | ≦0.0001 | 0.026 | 0.008 | 0.0005 | ≦5000 |
| Sulphate (SO$_4^{--}$) | 4.95 | 1.9 | 2.2 | 18.23 | |
| Total sulphur (S) | 2.41 | nd | | | |
| Carbon dioxide (CO$_2$) | 6.99 | nd | | | |
| Ammonia (NH$_3$) | 0.51 | nd | | | |
| Chromium (Cr) | ≦0.002 | nd | | | |
| Aluminium (Al) | ≦0.005 | nd | | | |
| Bismuth (Bi) | ≦0.005 | nd | | | |
| Tin (Sn) | ≦0.01 | nd | | | |
| Calcium (Ca) | | 13.8 | | | |

| -continued | |
|---|---|
| Volume of mother-liquors recovered | 820 ml |
| Volume of washing waters recovered | 1060 ml |
| Dry weight of residual cake | 94.5 g |
| Yield of the dissolution of the nickel | 77.2% |

EXAMPLE IV

| | |
|---|---|
| Mixture to be treated | 300 g of residue containing 80% water derived from a first attack on B.N.C. |
| Aqueous phase for the suspension | 300 ml water |
| Amount of chlorine injected | 40 g per liter |
| Duration of the reaction | 5 hours |
| Working temperature | 75° C. |

The results of the analysis of the cake, the mother-liquors and the washing waters are given in the following table together with the composition of the starting mixture:

| | COMPOSITION | | | |
|---|---|---|---|---|
| | of the dried initial product (%) | of the mother-liquors (g/l) | of the washing waters (g/l) | of the cake (%) |
| Nickel (Ni) | 45 | 65.80 | 22.10 | 45.5 |
| Cobalt (Co) | 2.63 | 0.003 | 0.03 | 9.95 |
| Iron (Fe) | 0.67 | 0.0001 | 0.0002 | 1.90 |
| Manganese (Mn) | 0.24 | 0.004 | 0.0002 | 0.63 |
| Zinc (Zn) | 0.040 | 0.110 | 0.037 | 0.025 |
| Copper (Cu) | 0.27 | 0.170 | 0.046 | 0.31 |
| Lead (Pb) | nd | ≦0.0003 | 0.0003 | ≦0.010 |
| Sulphate ($SO_4^{--}$) | nd | 5.50 | 1.80 | 1.14 |
| Total sulphur (S) | nd | 1.80 | 0.62 | 0.40 |

| | |
|---|---|
| Volume of mother-liquors recovered | 450 ml |
| Volume of washing waters recovered | 430 ml |
| Dry weight of residual cake | 22 g |
| Yield of the dissolution of the nickel | 68.5% |
| Final pH | 3.3 |

EXAMPLE V

| | |
|---|---|
| Mixture to be treated | 134 g of a residue of B.N.C. after two successive attacks |
| Aqueous phase for the suspension | 180 ml water |
| Amount of chlorine injected | 40 g per hour |
| Duration of the reaction | 5 hours |
| Working temperature | 75° C. |

The results of the analysis of the cake, the mother-liquors and the washing waters are given in the following table together with the composition of the starting mixture:

| | COMPOSITION | | | |
|---|---|---|---|---|
| | of the dried initial product (%) | of the mother-liquors (g/l) | of the washing waters (g/l) | of the cake (%) |
| Nickel (Ni) | 51 | 2.5 | 8.3 | 43 |
| Cobalt (Co) | 6.3 | 0.27 | 0.0007 | 11.30 |
| Iron (Fe) | 1.1 | 0.0009 | 0.0005 | 2.30 |
| Manganese (Mn) | 0.40 | 0.0002 | 0.0002 | 0.70 |
| Zinc (Zn) | 0.06 | 0.065 | 0.022 | 0.04 |
| Copper (Cu) | 0.38 | 0.20 | 0.059 | 0.34 |
| Lead (Pb) | nd | 0.0002 | 0.0002 | 0.18 |
| Sulphate ($SO_4^{--}$) | nd | 1.20 | 0.58 | 1.13 |
| Total sulphur (S) | nd | 0.46 | 0.20 | nd |

| | |
|---|---|
| Volume of mother-liquor recovered | 175 ml |
| Volume of washing water recovered | 220 ml |
| Dry weight of residual cake | 10.5 g |
| Yield of the dissolution of the nickel | 57% |
| Final pH | 2.2 |

EXAMPLE VI

| | |
|---|---|
| Mixture to be treated | 125 g of an oxide derived from moderate roasting of a matte at about 700°–800° C. |
| Aqueous phase for the suspension | 1 liter of water |
| Duration of the introduction of the oxide | 6 hours |
| Amount of chlorine injected | 37 g per hour |
| Duration of the addition of chlorine | 6 hours |
| Working temperature | 95° C. |

The reaction was allowed to continue for one hour after the end of the addition of chlorine.

The results of the analysis of the cake, the mother-liquors and the washing waters are given in the following table together with the composition of the starting mixture:

| | COMPOSITION | |
|---|---|---|
| | of the dried initial product % | of the mother-liquors and the washing waters % |
| Nickel (Ni) | 72.23 | 42 |
| Cobalt (Co) | 1.75 | 0.002 |
| Iron (Fe) | 3.25 | 0.002 |
| Sulphate ($SO_4^{--}$) | nd | 9.7 |
| Total sulphur (S) | 2.70 | nd |

| | |
|---|---|
| Volume of mother-liquors recovered } Volume of washing waters recovered | 110 ml |
| Yield of the dissolution of the nickel | 45.5% |
| Final pH | 5.0 (95° C.) |

EXAMPLE VII

| | |
|---|---|
| Mixture to be treated | 125 g of an oxide derived from moderate roasting of a matte at about 700°–800° C. |
| Aqueous phase for the suspension | 1 liter of water |
| Duration of the introduction of the oxide | 5 hours (6.25 g each quarter hour) |
| Amount of chlorine injected | 19 g per hour |
| Duration of the addition of chlorine | 12 hours |

The reaction was allowed to continue for 7 hours after the end of the addition of chlorine.

The results of the analysis of the cake, the mother-liquors and the washing waters are given in the following table together with the composition of the starting mixture:

| | COMPOSITION | | | K with respect to | |
|---|---|---|---|---|---|
| | of the dried initial product % | of the mother-liquor & the wash- % | of the cake % | iron | cobalt |
| Nickel (Ni) | 72.23 | 53.6 | 46 | 1227 | 658 |
| Cobalt (Co) | 1.75 | ≦0.002 | 4.7 | | |
| Iron (Fe) | 3.25 | ≦0.002 | 9 | | |
| Sulphate ($SO_4^{--}$) | nd | 10.8 | nd | | |
| Total sulphur (S) | 2.70 | nd | | | |

| | |
|---|---|
| Volume of mother-liquor recovered and Volume of washing water recovered | 1110 ml |
| Dry weight of residual cake | 36 g |
| Yield of the dissolution of the nickel | 78% |
| Final pH | 3.4 |

EXAMPLE VIII

Trial of continuous dissolution of an oxide of nickel

A trial for a continuous period of five days was carried out on a micropilot scale according to the scheme represented in FIG. 1. As the drawing shows, the lixiviation of the oxide was carried out in two cascade reactors of about 2 liters, the first being fed with the initial oxide previously suspended in the filtrate obtained from the outlet of the second reactor which, itself, is fed by a suspension in water of the residue leaving the second reactor.

The temperatures and durations of lixiviation were identical in each reactor and respectively equal to 95° C. and 12 hours. The rate of feed of oxide was 25 g per hour and that of the incoming water was 170 ml per hour. The charge of chlorine was equal to twice the stoichiometric quantity with respect to nickel, namely 41 g per hour.

After continuous operation of about 100 hours, there were obtained a solution of nickel chloride and a residue.

The results of the analysis of the residue and of the lixiviation solution are shown in the following table together with the composition of the starting mixture:

| | COMPOSITION | | | K with respect to | |
|---|---|---|---|---|---|
| | of the dried initial product % | of the lixiviation solution g/l | of the residue | iron | cobalt |
| Nickel (Ni) | 68.8 | 84 | 22 | 1830 | 220 |
| Cobalt (Co) | 1.8 | 0.010 | 5.3 | | |
| Iron (Fe) | 3.0 | ≦0.003 | 10.3 | | |
| Total Sulphur (S) | 2.30 | 2.9 | 0.17 | | |

| | |
|---|---|
| Yield of the dissolution of nickel | 84% |
| pH of the lixiviation solution | 4.3 |

EXAMPLE IX

Treatment of a zinc oxide mineral obtained from the slag heaps of a paper factory in France The mineral treated was composed essentially of clay ($SiO_2+Al_2O_3+MgO$), of carbonates ($CaCO_3-MgCO_3$), of iron oxide (limonite), of lead oxide and of smithsonite ($ZnCO_3$).

| | |
|---|---|
| Mixture to be treated | 129.4 g |
| Aqueous phase for the suspension | 1000 ml of water |
| Charge of chlorine | 20 g per hour |
| Duration of the reaction | 6 hours |
| Working temperature | 85° C. |

KINETICS OF THE ATTACK

| | Composition of the fully dry starting product | Composition of the solution after (g/l) | | | | | |
|---|---|---|---|---|---|---|---|
| Element | (%) | 1 h | 2 h | 3 h | 4 h | 5 h | 6 h |
| Zinc (Zn) | 8.2 | 6.70 | 7.04 | 7.56 | 7.64 | 7.68 | 7.72 |
| Lead (Pb) | 4.5 | 0 | 0 | 0 | 0 | 0.1 | 0.1 |
| Magnesium (Mg) | 2.5 | 2.18 | 3.02 | 3.16 | 3.16 | 3.16 | 3.16 |
| Calcium (Ca) | 5.1 | 3.76 | 4.88 | 4.95 | 5.15 | 5.20 | 5.20 |
| Iron (Fe) | 6.25 | | | | | | |
| pH | | 3.5 | 2.9 | 2.35 | 2.32 | 1.9 | 2.1 |
| Chloride ($Cl^-$) | nd | 20.15 | 33.02 | 32.84 | 34.79 | 34.26 | 32.84 |

BALANCE SHEET OF THE ATTACK

| Element | Composition of the fully dry starting product (%) | COMPOSITION | | | | Yield of the attack with respect to the initial product |
|---|---|---|---|---|---|---|
| | | of the starting solution (g/l) | of the mother-liquors (g/l) | of the washing waters (g/l) | of the residue (%) | |
| Zinc (Zn) | 8.2 | 0 | 7.95 | 0.78 | 1.8 | 85.9 |
| Lead (Pb) | 4.5 | 0 | 0.12 | 0 | 6.3 | 2.5 |
| Magnesium (mg) | 2.5 | 0 | 3.2 | 0.32 | 0.08 | 98.4 |
| Calcium (Ca) | 5.1 | 0 | 5.1 | 0.55 | 0.22 | 97 |
| Iron (Fe) | 6.25 | 0 | — | — | 8 | — |

| | |
|---|---|
| Volume of mother-liquor recovered | 1050 ml |
| Volume of washing waters recovered | 500 ml |
| Weight of residual cake | 79.8 g |

EXAMPLE X

| | |
|---|---|
| Mixture to be treated | 123 g of a mineral obtained from the slag heaps of a paper factory in France |
| Aqueous phase for the suspension | 1000 ml of a solution containing 180.8 g of magnesium chloride and |

| | |
|---|---|
| | 1786.7 g of calcium chloride hexahydrate |
| Charge of chlorine | 8.6 g per hour |
| Duration of the reaction | 7 hours |
| Working temperature | 85° C. |

KINETICS OF THE ATTACK

-continued

| | | | | | | | |
|---|---|---|---|---|---|---|---|
| Zinc (Zn) | 8.2 | 6.70 | 7.10 | 7.15 | 7.20 | 7.25 | 7.30 | 7.36 |
| Lead (Pb) | 4.5 | 5.1 | 5.2 | 5.0 | 4.7 | 4.3 | 4.4 | 4.2 |
| pH | | 3.2 | 2.8 | 2.8 | 2.8 | 3.3 | 3.1 | 3.1 |

BALANCE SHEET OF THE ATTACK

| Element | Composition of the fully dry starting product (%) | COMPOSITION of the starting solution (g/l) | of the mother-liquors (g/l) | of the washing waters (g/l) | of the residue (%) | Yield of the attack with respect to the initial product |
|---|---|---|---|---|---|---|
| Zinc (Zn) | 8.2 | 0 | 7.30 | 0.09 | 2.13 | 78.5 |
| Lead (Pb) | 4.5 | 0 | 4.35 | 0.23 | 1.25 | 78.8 |
| Magnesium (Mg) | 2.5 | | | | 0.49 | 84.8 |
| Calcium (Ca) | 5.1 | | | | 4.25 | 35.5 |
| Iron (Fe) | 6.25 | 0 | | | 6.65 | |

| | |
|---|---|
| Volume of mother-liquor recovered | 1010 ml |
| Volume of washing waters recovered | 500 ml |
| Weight of residual cake | 95.5 g |

EXAMPLE XI

Attack on the dusts from the smoke of the blast furnaces of Anzin

| | |
|---|---|
| Mixture to be treated | 100 g of dusts from the smoke |
| Aqueous phase for the suspension | 1000 ml of water |
| Charge of chlorine | 8 g per hour |
| Duration of the reaction | 5½ hours |
| Working temperature | 85° C. |

KINETICS OF THE ATTACK

| Element | Composition of the fully dry starting product (%) | Composition of the solution after (g/l) | | | | | | |
|---|---|---|---|---|---|---|---|---|
| | | 30 m | 1 h | 2 h | 3 h | 4 h | 5 h | 5.30 h | 7 h |
| Zinc (Zn) | 10.08 | 1 | 1.4 | 4 | 6.1 | 6.9 | 7.2 | 7.7 | |
| Lead (Pb) | 6.88 | — | — | — | — | — | 0.37 | 0.45 | |
| Magnesium (Mg) | 2.32 | 0.05 | 0.4 | 1 | 1.45 | 1.5 | 1.55 | 1.6 | |
| Calcium (Ca) | 8.8 | 2.1 | 2.1 | 2.8 | 3.3 | 4.1 | 4.1 | 4.1 | |
| Iron (Fe) | 27 | <0.001 | 0.001 | 0.0015 | 0.002 | 0.009 | 0.076 | 0.056 | |
| pH | | 6.9 | 6.85 | 4.8 | 2.9 | 2.5 | 2.4 | 2.4 | |
| Chloride (Cl−) | | 4 | 5.7 | 12.8 | 17.8 | 20.6 | 22.2 | 22.3 | |

BALANCE SHEET OF THE ATTACK

| Element | Composition of the fully dry starting product (%) | COMPOSITION of the mother-liquors (g/l) | of the washing waters (g/l) | of the residue (%) | Yield of the attack with respect to the initial product |
|---|---|---|---|---|---|
| Zinc (Zn) | 10.08 | 5.38 | 0.34 | 5.57 | 50.7 |
| Lead (Pb) | 6.88 | 0.31 | 0.008 | 6.93 | 4.5 |
| Magnesium (Mg) | 2.32 | 1.67 | 0.09 | 0.76 | 70.2 |
| Calcium (Ca) | 8.8 | 5.65 | 0.81 | 2.80 | 69.3 |
| Iron (Fe) | 27 | 0.015 | 0.002 | 22.43 | |
| Cadmium (Cd) | 0.05 | | | | |
| Manganese (Mn) | 3.96 | | | | |
| Silver (Ag) | 88 ppm | | | | |
| Silica (SiO$_2$) | 3.68-3.76 | | | | |
| Aluminium (Al$_2$O$_3$) | 0.91 | | | | |

EXAMPLE XII

| Mixture to be treated | 100 g of dust from blast furnaces |
|---|---|
| Aqueous phase for the suspension | 1000 ml of a solution containing 180.8 g of magnesium chloride and 1786.7 g of calcium chloride hexahydrate |
| Charge of chlorine | 8 g per hour |
| Duration of the reaction | 7 hours |
| Working temperature | 85° C. |

KINETICS OF THE ATTACK

| Element | Composition of the fully dry starting product (%) | Composition of the solution after (g/l) | | | | | | | |
|---|---|---|---|---|---|---|---|---|---|
| | | 30 m | 1 h | 2 h | 3 h | 4 h | 5 h | 6 h | 7 h |
| Zinc (Zn) | 10.08 | 2.6 | 3.6 | 4.25 | 5.3 | 5.75 | 5.9 | 7 | 5.3 |
| Lead (Pb) | 6.88 | 0.02 | 0.013 | 0.45 | 0.80 | 1 | 1.15 | 1.50 | 1.85 |
| Iron (Fe) | 27 | 0.0095 | 0.0095 | 0.0095 | 0.0095 | 0.0095 | 0.0095 | 0.0095 | 0.0095 |
| pH | | 5.8 | 5.2 | 4.1 | 3.8 | 3.7 | 3.6 | 3.4 | 3.3 |

BALANCE SHEET OF THE ATTACK

| Element | Composition of the fully dry starting product (%) | COMPOSITION | | | Yield of the attack with respect to the initial product |
|---|---|---|---|---|---|
| | | of the mother-liquors (g/l) | of the washing waters (g/l) | of the residue (%) | |
| Zinc (Zn) | 10.08 | 5.6 | 0.4 | 5.31 | 51.1 |
| Lead (Pb) | 6.88 | 1.9 | 0.082 | 5.50 | 25.2 |
| Magnesium (Mg) | 2.32 | | | 1.15 | 52.5 |
| Calcium (Ca) | 8.8 | | | 5.11 | 44.8 |
| Iron (Fe) | 27 | 0.01 | 0.004 | 20.38 | 0.06 |
| Cadmium (Cd) | 0.05 | | | | |
| Manganese (Mn) | 3.96 | | | | |
| Silver (Ag) | 88 ppm | | | | |
| Silica (SiO$_2$) | 3.68–3.76 | | | | |
| Aluminium (Al$_2$O$_3$) | 0.91 | | | | |
| Volume of mother-liquors recovered | 900 ml | | | | |
| Volume of washing waters recovered | 600 ml | | | | |
| Weight of residual cake | 95 g | | | | |

EXAMPLE XIII

The mixtures of oxides treated in Examples XIII to XVI were the residues derived from a factory for the production of zinc situated in Crotone in Italy. The principal phases found in these residues are:

$ZnFe_2O_4$—$CaSO_4$, $2H_2O$—$ZnS$—$PbSO_4$—$ZnSO_4$, $H_2O$ and $CaSO_4 \cdot \frac{1}{2}H_2O$

| Mixture to be treated | 80 g of residue |
|---|---|
| Aqueous phase for the suspension | 1000 ml of water |
| Charge of chlorine | 8 g per hour |
| Duration of the reaction | 6 hours |
| Working temperature | 85° C. |

KINETICS OF THE ATTACK

| Element | Composition of the initial product (%) | Composition of the solution after (g/l) | | | | | |
|---|---|---|---|---|---|---|---|
| | | 1 h | 2 h | 3 h | 4 h | 5 h | 6 h |
| Zinc (Zn) | 13.5 | 3.5 | 3.7 | 3.7 | 4.2 | 4.3 | 4.6 |
| Lead (Pb) | 5.20 | 0.0058 | 0.00625 | 0.0074 | 0.008 | 0.0095 | 0.0106 |
| Magnesium (Mg) | 0.83 | 0.375 | 0.375 | 0.475 | 0.325 | 0.325 | 0.325 |
| Calcium (Ca) | 5.60 | 0.510 | 0.520 | 0.500 | 0.370 | 0.360 | 0.390 |
| Iron (Fe) | 15.6 | 0.083 | 0.104 | 0.115 | 0.225 | 0.275 | 0.350 |
| pH | | 1.6 | 1.5 | 1.35 | 1.2 | 1.1 | 1.1 |
| Chloride (Cl$^-$) | — | 3.7 | 5 | 5.6 | 7.3 | 7.9 | 8.7 |

BALANCE SHEET OF THE ATTACK

| Element | Composition of the fully dry starting product (%) | COMPOSITION of the mother-liquors (g/l) | COMPOSITION of the washing waters (g/l) | of the residue (%) | Yield of the attack with respect to the initial product |
|---|---|---|---|---|---|
| Zinc (Zn) | 13.5 | 5 | 0.5 | 8.97 | 41.5 |
| Lead (Pb) | 5.20 | 0.0105 | 0.0025 | 5.55 | 0.24 |
| Magnesium (Mg) | 0.83 | 0.425 | 0.047 | 0.13 | 80.4 |
| Calcium (Ca) | 5.60 | 0.520 | 0.440 | 3.64 | 20.9 |
| Iron (Fe) | 15.6 | 0.4 | 0.030 | 13.61 | 3.6 |

| | |
|---|---|
| Volume of mother-liquors recovered | 900 ml |
| Volume of washing waters recovered | 560 ml |
| Weight of residual cake | 95 g |

EXAMPLE XIV

| | |
|---|---|
| Mixture to be treated | 80 g of residue |
| Aqueous phase for the suspension | 1000 ml of water |
| Charge of chlorine | 8 g per hour |
| Duration of the reaction | 6 hours |
| Working temperature | 85° C. |

KINETICS OF THE ATTACK

| Element | Composition of the initial product | Composition of the solution after (g/l) 1 h | 2 h | 3 h | 4 h | 5 h | 6 h |
|---|---|---|---|---|---|---|---|
| Zinc (Zn) | 11.3 | 0.9 | 1.2 | 1.3 | 1.3 | 1.8 | 1.8 |
| Lead (Pb) | 7.25 | 0.0045 | 0.0048 | 0.0056 | 0.0058 | 0.006 | 0.00625 |
| Magnesium (Mg) | 0.47 | 0.030 | 0.0325 | 0.034 | 0.035 | 0.036 | 0.037 |
| Calcium (Ca) | 5.68 | 0.420 | 0.440 | 0.440 | 0.390 | 0.440 | 0.450 |
| Iron (Fe) | 19.1 | 0.140 | 0.144 | 0.146 | 0.147 | 0.151 | 0.151 |
| pH | | 1.75 | 1.70 | 1.65 | 1.60 | 1.55 | 1.50 |
| Chloride (Cl$^-$) | | 2.3 | 2.5 | 2.8 | 3 | 3.2 | 3.4 |

BALANCE SHEET OF THE ATTACK

| Element | Composition of the fully dry starting product (%) | COMPOSITION of the mother-liquors (g/l) | COMPOSITION of the washing waters (g/l) | of the residue (%) | Yield of the attack with respect to the initial product |
|---|---|---|---|---|---|
| Zinc (Zn) | 11.3 | 1.7 | 0.16 | 9.52 | 18 |
| Lead (Pb) | 7.25 | 0.007 | 0.0025 | 6.95 | 0.2 |
| Magnesium (Mg) | 0.47 | 0.037 | 0.00004 | 0.41 | 8.6 |
| Calcium (Ca) | 5.68 | 0.590 | 0.360 | 21.1 | |
| Iron (Fe) | 19.1 | 0.125 | 0.031 | 15.50 | 1.1 |

| | |
|---|---|
| Volume of mother-liquors recovered | 890 ml |
| Volume of washing waters recovered | 630 ml |
| Weight of residual cake | 77 g |

The preceding description and examples allow those skilled in the art to appreciate the value and versatility of the process described above and to choose the correct operating conditions to solve their problems. They will moreover note the particular interest which there is in using this process to separate the nickel from cobalt and the iron contained in the basic carbonates of nickel and in the impure nickel oxides obtained from the roasting of mattes.

We claim:

1. A process for the selective dissolution of oxygenated compounds containing at least a nickel compound selected from the group consisting of nickel oxide, nickel carbonate and mixtures thereof, present in a mixture of oxygenated compounds containing said nickel compound and at least cobalt, copper and lead, comprising suspending the mixture of the oxygenated compounds in an aqueous phase, treating the resulting aqueous suspension at a pH exceeding about 1 and at a temperature of from about 60° to 100° C. with chlorine to selectively solubilize said nickel compound while said cobalt, copper and lead remain in an essentially insoluble residue, and separating the aqueous solution containing the dissolved said nickel compound from the insoluble residue.

* * * * *

UNITED STATES PATENT AND TRADEMARK OFFICE
CERTIFICATE OF CORRECTION

PATENT NO.  : 4,435,368
DATED       : Mar. 6, 1984
INVENTOR(S) : Jean-Michel DEMARTHE, et al It is certified that error appears in the above-identified patent and that said Letters Patent is hereby corrected as shown below:

On the title page, after "[73] Assignee" change the assignee's name to --Minemet Recherche--

Title page, after "Attorney, Agent, or Firm" change the name of the Attorneys to --Fleit, Jacobson, Cohn and Price--.

*Signed and Sealed this*

*Fifth* Day of *February 1985*

[SEAL]

*Attest:*

DONALD J. QUIGG

*Attesting Officer*  *Acting Commissioner of Patents and Trademarks*